(12) United States Patent
Zeng et al.

(10) Patent No.: US 10,705,026 B2
(45) Date of Patent: Jul. 7, 2020

(54) SCANNING DIFFERENTIAL INTERFERENCE CONTRAST IN AN IMAGING SYSTEM DESIGN

(71) Applicant: KLA CORPORATION, Milpitas, CA (US)

(72) Inventors: Andrew Zeng, Fremont, CA (US); Xuan Wang, Fremont, CA (US); Steve Xu, Sunnyvale, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 16/584,370

(22) Filed: Sep. 26, 2019

(65) Prior Publication Data

US 2020/0132608 A1      Apr. 30, 2020

Related U.S. Application Data

(60) Provisional application No. 62/751,472, filed on Oct. 26, 2018.

(51) Int. Cl.
*G01N 21/88* (2006.01)
*G01N 21/95* (2006.01)
*G02B 27/14* (2006.01)
*G02B 27/30* (2006.01)

(52) U.S. Cl.
CPC ..... *G01N 21/8806* (2013.01); *G01N 21/9501* (2013.01); *G02B 27/141* (2013.01); *G02B 27/30* (2013.01); *G01N 2021/8825* (2013.01); *G01N 2021/8848* (2013.01)

(58) Field of Classification Search
CPC ....... G01N 21/9501; G01N 2021/8825; G01N 21/8806; G02B 21/361; G02B 21/141; G02B 27/30; G02B 21/14
See application file for complete search history.

(56) References Cited

U.S. PATENT DOCUMENTS

| | | | | |
|---|---|---|---|---|
| 5,420,717 A * | 5/1995 | Tabata | ................. | G02B 5/3083 359/371 |
| 6,404,544 B1 * | 6/2002 | Kuhn | ....................... | G01B 9/04 359/371 |
| 6,741,356 B1 * | 5/2004 | Ishiwata | ................. | G01B 9/04 356/491 |
| 9,726,615 B2 | 8/2017 | Huang et al. | | |
| 2001/0040723 A1 * | 11/2001 | Kusaka | ................. | G02B 21/14 359/370 |
| 2005/0254065 A1 | 11/2005 | Stokowski | | |
| 2008/0273193 A1 | 11/2008 | Nishiyama et al. | | |

(Continued)

FOREIGN PATENT DOCUMENTS

JP      2018054303 A      4/2018

OTHER PUBLICATIONS

WIPO, ISR for PCT/US2019/057971, Feb. 14, 2020.

*Primary Examiner* — Steven Whitesell Gordon
(74) *Attorney, Agent, or Firm* — Hodgson Russ LLP

(57) ABSTRACT

The inspection system includes an illumination source, a TDI-CCD sensor, and a dark field/bright field sensor. A polarizer receives the light from the light source. The light from the polarizer is directed at a Wollaston prism, such as through a half wave plate. Use of the TDI-CCD sensor and the dark field/bright field sensor provide high spatial resolution, high defect detection sensitivity and signal-to-noise ratio, and fast inspection speed.

20 Claims, 9 Drawing Sheets

(56) References Cited

U.S. PATENT DOCUMENTS

| | | | |
|---|---|---|---|
| 2009/0208072 A1* | 8/2009 | Seibel | G01N 15/1436 |
| | | | 382/128 |
| 2011/0188020 A1* | 8/2011 | Den Boef | G03F 7/70633 |
| | | | 355/71 |
| 2011/0242312 A1* | 10/2011 | Seki | G01N 21/9505 |
| | | | 348/125 |
| 2012/0092484 A1 | 4/2012 | Taniguchi et al. | |
| 2018/0070040 A1 | 3/2018 | Chuang et al. | |

* cited by examiner

Illumination with Broadband LED

Illumination with Laser

SCANNING DIFFERENTIAL INTERFERENCE CONTRAST IN AN IMAGING SYSTEM DESIGN

CROSS-REFERENCE TO RELATED APPLICATIONS

This application claims priority to the provisional patent application filed Oct. 26, 2018 and assigned U.S. App. No. 62/751,472, the disclosure of which is hereby incorporated by reference.

FIELD OF THE DISCLOSURE

This disclosure relates to imaging systems for inspecting wafers.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer that are separated into individual semiconductor devices.

Inspection processes are used at various steps during semiconductor manufacturing to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary because even relatively small defects may cause unwanted aberrations in the semiconductor devices.

As design rules shrink, however, semiconductor manufacturing processes may be operating closer to the limitation on the performance capability of the processes. In addition, smaller defects can have an impact on the electrical parameters of the device as the design rules shrink, which drives more sensitive inspections. As design rules shrink, the population of potentially yield-relevant defects detected by inspection grows dramatically, and the population of nuisance defects detected by inspection also increases dramatically. Therefore, more defects may be detected on the wafers, and correcting the processes to eliminate all of the defects may be difficult and expensive. Determining which of the defects actually have an effect on the electrical parameters of the devices and the yield may allow process control methods to be focused on those defects while largely ignoring others. Furthermore, at smaller design rules, process-induced failures, in some cases, tend to be systematic. That is, process-induced failures tend to fail at predetermined design patterns often repeated many times within the design. Elimination of spatially-systematic, electrically-relevant defects can have an impact on yield.

As tolerances on semiconductor device fabrication processes continue to narrow, the demand for improved semiconductor wafer inspection tools continues to increase. Types of inspection tools suitable for wafer inspection include a dark field (DF) inspection tool, which utilizes scattering information from a sample (e.g., semiconductor wafer), and a differential interference contrast (DIC) inspection tool, which utilizes phase information from a sample. Typically, when seeking both DF and DIC information, a given inspection tool or microscope operates independently in either DF mode or DIC mode due to differences and/or incompatibilities in optical components, optical layout, and the detection signal. Although it is possible to run different optical layouts separately to detect DF and DIC signals separately, it is time-consuming, and sometimes impossible, to combine two separated signals during the observation of a moving sample (e.g., biological living cell). In the semiconductor fabrication industry, it is important for inspection equipment to be capable of quickly locating and classifying one or more defects. As a result, performing DF and DIC inspection in separate operations reduces value to the wafer inspection process.

As sensitivity and throughput requirements increase for a defect inspection system, DIC performance approaches its limit with the existing architecture. DIC can have poor spatial resolution, consequently resulting in low defect detection sensitivity for a defect inspection system. To increase spatial resolution, light spot size on inspection surface must be reduced, leading to low inspection throughput.

Therefore, improved inspection systems and inspection methods are needed.

BRIEF SUMMARY OF THE DISCLOSURE

An apparatus is provided in a first embodiment. The apparatus includes at least one illumination source; a stage configured to secure a wafer; a TDI-CCD sensor; a dark field/bright field sensor; a field stop in a light path from the illumination source; a polarizer in the light path; a Wollaston prism in the light path; a correction lens optic in the light path; a mirror in the light path that receives the P polarized light and the S polarized light from the Wollaston prism; and an objective lens assembly in the light path. The polarizer is configured to pass P polarized light and reflect S polarized light. The Wollaston prism forms the P polarized light and the S polarized light. The correction lens optic, the mirror, and the objective lens assembly are configured to focus the P polarized light and the S polarized light onto the stage, wherein the P polarized light and the S polarized light are separated in a shear direction of the Wollaston prism, and wherein the P polarized light and the S polarized combine at the Wollaston prism.

The polarizer can be a polarizing beam splitter cube.

The field stop can be a controlled variable field stop. A tangential width of the field stop can be configured to vary with scanning radius whereby the tangential width at an end of the field stop is larger than at an opposite end of the field stop.

The apparatus can further include a half wave plate in the light path that rotates the P polarized light by 45 degrees.

The Wollaston prism can be oriented with a principle axis at 0 degrees.

The mirror may be a fold mirror.

The illumination source may be a broadband light emitting diode.

The apparatus can further include a dichroic mirror in the light path between the objective lens assembly and the mirror. The dichroic mirror can direct the S polarized light at the dark field/bright field sensor.

The apparatus can further include a collimating optics assembly in the light path between the field stop and the polarizer.

The apparatus can be configured to provide a differential interference contrast mode.

A method is provided in a second embodiment. The method includes generating a light beam using an illumination source. The light beam is directed from the illumination source through a field stop. The light beam is directed from the field stop through a polarizer. The light beam is directed from the polarizer to a Wollaston prism. The light beam is directed from the Wollaston prism to a correction lens optic. The light beam is directed from the correction lens optic to a mirror. The light beam is directed toward a wafer on a stage through an objective lens assembly. The correction lens optic, the mirror, and the objective lens assembly are configured to focus P polarized light and S polarized light from the Wollaston prism onto the stage. The P polarized light and the S polarized light are separated in a shear direction of the Wollaston prism. The light beam reflected from the wafer on the stage is split with a dichroic mirror into a first light beam and a second light beam. The first light beam is received with a dark field/bright field sensor. The P polarized light and the S polarized light of the second light beam are combined at the Wollaston prism. The second light beam from the Wollaston prism is received with a TDI-CCD sensor.

The polarizer can be a polarizing beam splitter cube in the light path. The polarizing beam splitter can be configured to pass P polarized light and reflect S polarized light.

The method can further include directing the light beam through a half wave plate that rotates the P polarized light by 45 degrees. The half wave plate can be disposed between the polarizer and the Wollaston prism.

The field stop can be a controlled variable field stop. A tangential width of the field stop can be configured to vary with scanning radius whereby the tangential width at an end of the field stop is larger than at an opposite end of the field stop.

The Wollaston prism can be oriented with a principle axis at 0 degrees.

The mirror may be a fold mirror.

The illumination source may be a broadband light emitting diode.

The method can be configured to provide a differential interference contrast mode The method can further include collimating the light beam directed by the field stop using a collimating optics assembly.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

The embodiments disclosed herein can provide high spatial resolution, high defect detection sensitivity and signal-to-noise ratio (SNR), and fast inspection speed. The design can be referred to as an imaging phase-contrast channel (PCC). The PCC design offers, additionally, low image blurring while maintaining relatively low light budget and good field retardation uniformity.

The embodiments disclosed herein include a DIC design by optical imaging on a dual inspector system. The imaging DIC can use a TDI (time-delay-integration) charge-coupled device (CCD) sensor for a scanner system. The DIC design also can implement polarization optics and a variable field-stop for light-budget enhancement and image blurring reduction in an R-Θ scanner system.

In the embodiments disclosed herein, the TDI sensor can be a standalone scanning inspector application. For example, the TDI sensor can be used in a standalone scanning inspector application for wafer defect inspection. A broadband LED illumination source or other illumination source can be used.

Figure 1:
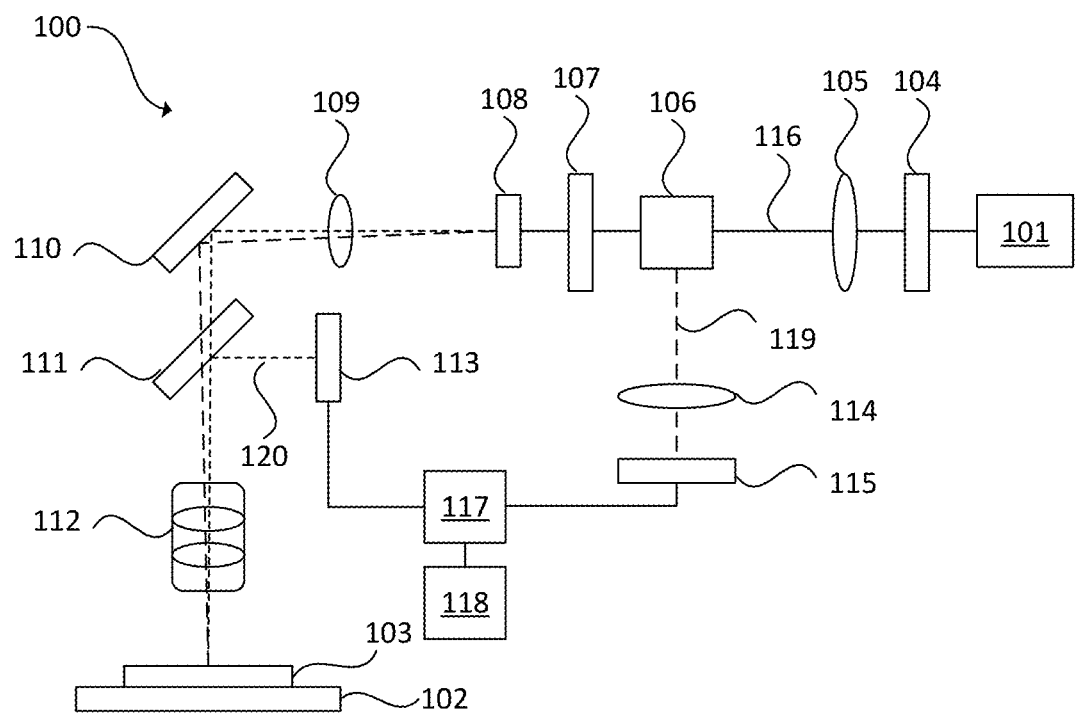
FIG. 1 is a block diagram of an embodiment of an inspection system in accordance with the present disclosure.

FIG. 1 is a block diagram of an embodiment of an inspection system 100. The inspection system 100 can be a DIC architecture in an imaging optical design with a TDI-CCD sensor. The inspection areas are imaged onto the TDI sensor for both the DIC leading and trailing beams. The inspection system 100 can be a standalone scanning inspector system or as a subsystem of a dual, multi-inspector system. The design of the inspection system 100 combines polarization properties and components, making it efficient in light budget sensitive applications. In an R-Θ based scanner system, because image blurring occurs when image field of view (FoV) gets closer to center of rotation, a variable field-stop can be used effectively to reduce FoV in association with scanning radius and, therefore, reduce imaging blurring.

For a typical dual inspector system, such as a dark-field inspector and a bright-field inspector, a phase contrast-based defect detection channel (i.e., PCC) by DIC principle can be used for the bright-field inspector. When the TDI-CCD sensor is used, the PCC can adapt an imaging optical design and can use the general structure shown in FIG. 1.

The inspection system 100 includes at least one illumination source 101 and a stage 102 configured to secure a wafer 103. The illumination source 101 can be a broadband LED. The broadband LED can suppress background noise and provide improved signal-to-noise ratio. However, a laser also can be used for the illumination source 101. For example, a laser with speckle-reduction optics and/or surface noise reduction optics can be used. The inspection system 100 also can include both a broadband LED and laser, other types of light sources, or other combinations of light sources.

The inspection system 100 also includes a TDI-CCD sensor 115 and a dark field/bright field sensor 113. The dark field/bright field sensor 113 can operate as a dark field sensor or a bright field sensor. The dark field/bright field sensor 113 can be a PMT, photodiode or photodiode arrays, or a CCD imager in non-DIC mode.

The TDI-CCD sensor 115 can be used in scanning imagers to provide dynamic, fast, and high-quality image acquisitions. The CCD sensor used for the TDI-CCD sensor 115 can provide a time-delay-integration operation mode. The TDI-CCD sensor 115 works with a moving image whereby the pixels of the TDI-CCD sensor 115 are aligned and synchronized with the "pixels" of the moving image. While the image is moving, the corresponding pixels on the TDI-CCD sensor 115 are clocked forward and, as such, light (photons) from the image pixels are continuously accumulated onto the rows of pixels TDI-CCD sensor 115 until they are read out at the end of the sensor.

The TDI-CCD sensor 115 can be used for bright field or dark field measurements. An imager or a spot scanner can be used. In an instance, a spot scanner can have an illumination spot of, for example, 4 µm (tangential) by 100 µm (radial) with an elliptical spot. This spot size can set a lateral resolution of the system. The collection optics 114 used with the spot scanner can include a photo multiplier tube (PMT) to integrate light coming from the illumination spot. In another instance, an imager can be used. The imager can have better lateral resolution than the spot scanner. The imager can have hundreds or over a thousand rows of line detectors compared to the single detector of the spot scanner. The imager's row of line detectors can provide a pixel size as small as, for example, 0.65 µm.

A TDI-CCD sensor 115 has many advantages. A TDI-CCD sensor 115 can be used in low light image acquisition applications and can increase the signal-to-noise ratio from a traditional CCD sensor without sacrificing image frame rate. Conversely, a TDI-CCD sensor 115 provides equivalent image clarity at a faster frame rate, making it useful for image scanner applications.

The dark field/bright field sensor 113 can operate at a first wavelength.

A field stop 104 is positioned in a light path 116 from the illumination source 101. The field stop 104 can be a controlled variable field stop. Thus, a tangential width of the field stop 104 can be configured to vary with scanning radius whereby the tangential width at an end of the field stop is larger than at an opposite end of the field stop.

The inspection system 100 also includes a polarizer 106 in the light path 116. In an instance, the polarizer 106 is a polarizing beam splitter cube. The polarizing beam splitter cube is configured to pass P polarized light 119 and reflect S polarized light 120. In another instance, the polarizer 106 is a beam splitter with a polarizer and modules that allow P polarized light to transmit completely or partially along the light path 116 and S polarized light to be reflected completely or partially along the light path to the TDI-CCD sensor 115.

A collimating optics assembly 105 is disposed between the field stop 104 and the polarizer 106 in the light path 116. The collimating optics assembly 106 can collimate the light from the field stop 104.

A Wollaston prism 108 is disposed in the light path 116. The Wollaston prism 108 is a polarizing beam splitter. The Wollaston prism 108 separates light into two separate linearly polarized outgoing beams with orthogonal polarization (e.g., P polarized light 119 and S polarized light 120). Thus, incoming light includes P polarized light and S polarized light and is split into the P polarized light 119 and S polarized light 120. The two linearly polarized light beams propagate away from each other at a small angle (e.g., a split angle) defined by a shear design of the Wollaston prism 108 and its material properties. The two beams will be polarized according to the optical axis of the two right angle prisms. In an embodiment the Wollaston prism 108 receives the P polarized light 119 reflected from the wafer 103. In an instance, the Wollaston prism 108 is oriented with a principle axis at 0 degrees.

The inspection system 100 can also use a half-wave plate 107 such that the half-wave plate 107 minimizes the retardation non-uniformity across a pupil aperture on the Wollaston prism 108. The half-wave plate 107 can be disposed in the light path 116 such that it rotates the P polarized light 119 by 45 degrees.

A correction lens optic 109 can be disposed in the light path 116. The correction lens optic 109 may provide correction for PIC when using a dark field. However, there may be different aberrations at different wavelengths. Two wavelengths may be used in the inspection system 100, such as UV/DF at approximately 266 nm and PCC at approximately 365 nm. Other wavelengths are possible. UV/DF can be single or broad wavelength from, for example, extreme ultraviolet (EUV) to infrared. The PCC wavelength may be similar to the UV/DF wavelength provided that the two wavelength optical sources can be separated by dichroic mirror 111 that allows for two light paths with different wavelength groups.

A mirror 110 in the light path 116 can receive the P polarized light 119 and S polarized light 120 from the Wollaston prism. The mirror 110 may be a fold mirror or other types of mirrors.

An objective lens assembly 112 can be disposed in the light path 116. The objective lens assembly 112 can include more than two lenses (e.g., 11 or 12 lenses) and can use dark field and/or PIC. The objective lens assembly 112 can operate at two wavelengths.

The correction lens optic 109, the mirror 110, and the objective lens assembly 112 are configured to focus the P polarized light 119 and the S polarized light 120 onto the stage 102. The P polarized light and the S polarized light 120 are separated in a shear direction of the Wollaston prism 108. The P polarized light 119 and the S polarized light 120 reflected from the wafer 103 can be combined at the Wollaston prism 108. In FIG. 1, the P polarized light 119 and the S polarized light 120 are illustrated by dashed lines.

The inspection system can include a dichroic mirror 111 in the light path 116 between the objective lens assembly 112 and the mirror 110. The dichroic mirror 111 can direct S polarized light 120 reflected from the wafer 103 at the dark field/bright field sensor 113. The dark field/bright field sensor 113 can receive the S polarized light 120. In an instance, the dark field/bright field sensor 113 receives a first wavelength of light reflected from the wafer 103.

Collection optics 114 can be disposed in the light path 116 between the polarizer 106 and the TDI-CCD sensor 115. Collection optics 114 can include spherical positive and negative lenses, abortion compensation optics, zoom mechanisms, and/or other components that translate wafer 103 patterns or images to the TDI-CCD sensor 115. In an instance, the collection optics 114 can be a tube lens that forms an image on the TDI-CCD sensor 115 that is in focus and has the desired magnification.

A processor 117 is in electronic communication with the dark field/bright field sensor 113 and the TDI-CCD sensor 115. The processor 117 also may be coupled to the components of the inspection system 100 in any suitable manner (e.g., via one or more transmission media, which may include wired and/or wireless transmission media) such that the processor 117 can receive output. The processor 117 may be configured to perform a number of functions using the output. The inspection system 100 can receive instructions or other information from the processor 117. The processor 117 and/or the electronic data storage unit 118 optionally may be in electronic communication with another wafer inspection tool, a wafer metrology tool, or a wafer review tool (not illustrated) to receive additional information or send instructions.

The processor 117, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 117 and electronic data storage unit 118 may be disposed in or otherwise part of the inspection system 100 or another device. In an example, the processor 117 and electronic data storage unit 118 may be part of a standalone control unit or in a centralized quality control unit. Multiple processors 117 or electronic data storage units 118 may be used.

The processor 117 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 117 to implement various methods and functions may be stored in readable storage media, such as a memory in the electronic data storage unit 118 or other memory.

If the inspection system 100 includes more than one processor 117, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 117 may be configured to perform a number of functions using the output of the inspection system 100 or other output. For instance, the processor 117 may be configured to send the output to an electronic data storage unit 118 or another storage medium. The processor 117 may be further configured as described herein.

The processor 117 may be configured according to any of the embodiments described herein. The processor 117 also may be configured to perform other functions or additional steps using the output of the inspection system 100 or using images or data from other sources.

Various steps, functions, and/or operations of inspection system 100 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 117 or, alternatively, multiple processors 117. Moreover, different sub-systems of the inspection system 100 may include one or more computing or logic systems. Therefore, the above description should not be interpreted as a limitation on the present disclosure but merely an illustration.

In an instance, the processor 117 is in communication with the inspection system 100. The processor 117 can be configured to stream digitized CCD image data, form and process images, and/or separate images with defects. This can include finding phase defects or finding dark field defects.

An additional embodiment relates to a non-transitory computer-readable medium storing program instructions executable on a controller for performing a computer-implemented method for imaging a wafer and/or finding defects, as disclosed herein. In particular, as shown in FIG. 1, electronic data storage unit 118 or other storage medium may contain non-transitory computer-readable medium that includes program instructions executable on the processor 117. The computer-implemented method may include any step(s) of any method(s) described herein, including method 100.

In an embodiment of the inspection system 100, the illumination source 101 can be a single wavelength laser or an LED with wavelength ranging from deep ultraviolet (DUV) to visible to infrared. Light from the light source 101 illuminates the field stop 104. The field stop 104 can be a controlled variable field-stop for an R-Θ scanning system, allowing its tangential width to be varying in association with scanning radius. Time-delay-integration blur can be controlled.

The collimation optics assembly 105 collimates the light and sends it to the polarizer 106, which allows for P polarized light 119 to pass through and S polarized light 120 to be reflected. A half-wave plate 107 can be used to rotate the P polarization light by 45 degrees before it enters the Wollaston prism 108 oriented with its principle axis at 0 degrees. The Wollaston prism 108 splits the incoming beam into P and S beams of equal parts. Through the correction lens optics 109, mirror 110, and the objective lens assembly 112, which can be configured for the first wavelength imager and transparent for PCC wavelength, the P and S beams can be focused onto the inspection surface of the wafer 103. The P and S beams are separated in the shear direction of the Wollaston prism 108. In an instance, at 0 degrees defined by P polarization direction of the polarizer 106. The Wollaston prism 108 can be configured such that the shear spacing is a few pixels of TDI-CCD sensor image. Multiple Wollaston prisms 108 can be used and made user-selectable in a particular scanning system or setup for optimal signal to noise and spatial resolution.

On the collection path, both P and S reflected beams combine at the Wollaston prism 108 carrying relative phase-difference information from a defect on the wafer 103. Interference is yielded at the polarizer 106 and is reflected to the TDI-CCD sensor 115.

The correction lens optic 109 can be configured to provide a high level of image clarity for the PCC subsystem at the second wavelength when the objective lenses in the objective lens assembly 112 are designed for the first wavelength. Alternatively, a correction lens optic 109 can be configured for the first wavelength if the objective lens assembly 112 is configured for the second inspector wavelength.

In an instance, the TDI sensor can be a parallel inspector with a second wavelength. Dispersion compensation optics can be added to provide the desired imaging quality.

An imaging DIC design incorporating a TDI sensor also can be used in a rotationally-scanning inspector application and can use a radius-based variable light-source field stop that minimizes TDI image blurring in both radial and tangential directions.

Figure 2:
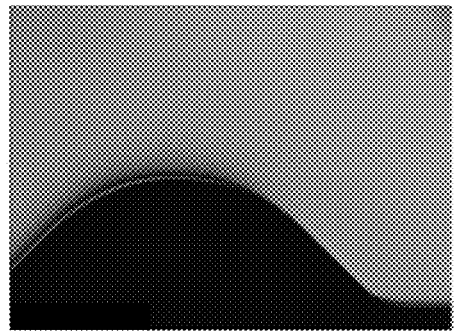
FIG. 2 illustrates a comparison between illumination with a broadband light emitting diode (LED) and illumination with a laser.
Figure 2:
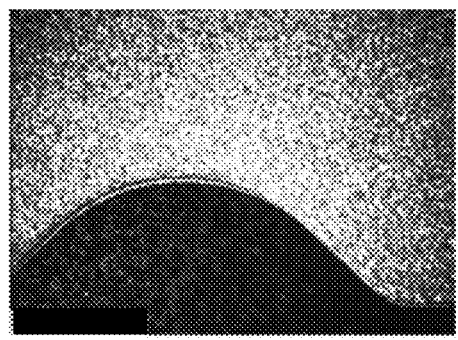

FIG. 2 illustrates a comparison between illumination with a broadband LED and illumination with a laser. In FIG. 2, the left image illustrates illumination with a broadband LED and the right image illustrates illumination with a laser. For DIC applications, a laser can provide high light intensity levels and wavelength purity (e.g., narrow line-width). However, the narrow line-width of the laser can cause coherence-induced surface noise effect, such as on relatively rough surfaces. This can make it difficult to detect small defects or particles. FIG. 2 illustrates the surface noise effect from an LED versus a laser from a PCC subsystem.

Figure 3:
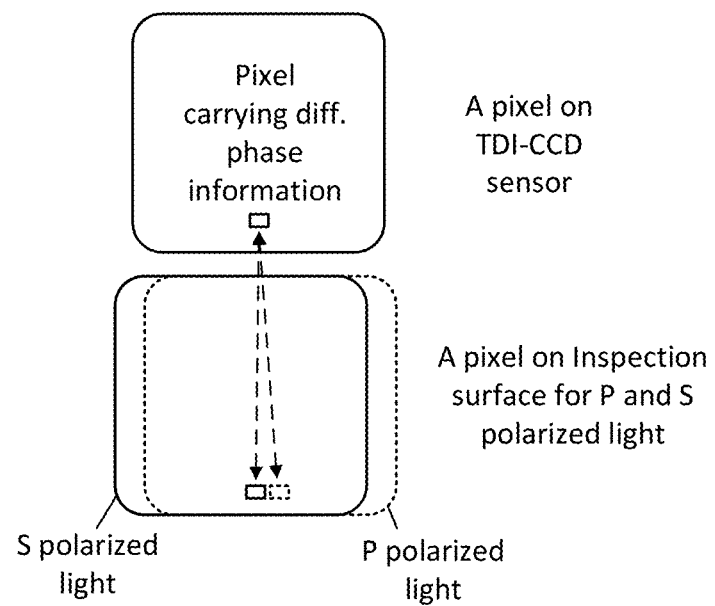
FIG. 3 and FIG. 4 illustrate, in accordance with an embodiment of the present disclosure, optical field of view in boxes that cover the entire TDI-CCD sensor and a CCD sensor that is time-delay-integration in nature.
Figure 4:
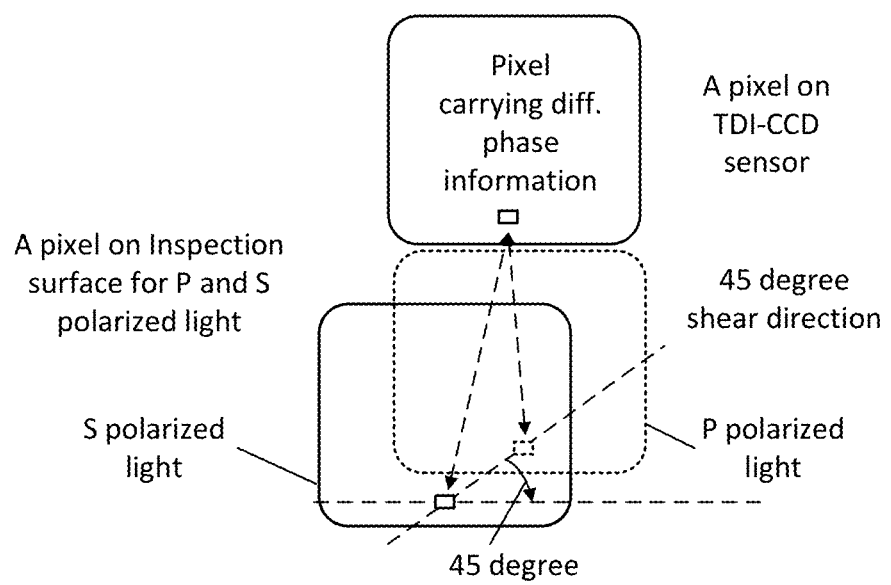

Referencing the PCC subsystem layout, FIG. 3 and FIG. 4 illustrate optical FoV in boxes that cover the entire TDI-CCD sensor and a CCD sensor that is time-delay-integration in nature. The different boxes represent the FoV for S and P polarized lights which combine at Wollaston prism and project on to TDI-CCD as one box. Alternatively, it can be viewed that an individual pixel on TDI-CCD corresponds to two pixels on inspection surface for the P and S polarized light. Shear direction can be selected along the direction of scan, although it can be tilted (e.g., 45 degree tilt in FIG. 3) for benefit of detection in both orthogonal axes as shown in FIG. 3, which can include optimizing the polarizer and half-wave plate orientations. While keeping the DIC angle of incidence to a small pixel to achieve a high spatial resolution, the inspection system 100 can maintain a relatively large FoV and, therefore, inspect a large area simultaneously with a high density CCD sensor. The angle of incidence can be normal incidence (i.e., 0 degrees to wafer surface 103). Tolerance is subject to the design of the inspection system 100. The FoV refers to the area that is viewable on the CCD sensor. In an instance, this may 1000 µm×100 µm. Other FoVs are possible and are subject to optical design and/or magnification selection to have larger or smaller viewable area of the wafer. Pixel resolution may be proportional to the viewable area size (or FoV size). In an instance, this is a parallel DIC system that can employ M by N number of photo detectors where M and N are CCD sensor pixel dimensions. When the CCD sensor is a TDI-CCD for a scanning system, light budget can be reduced M times where M is the TDI photon integration dimension. Conversely, with the same amount of light the CCD frame rate can be increased M times. In such applications, traditional CCD sensor usage may be limited by physically capable light budget or frame rate.

Pixels can move with a moving object. In an embodiment, the pixel is synched with a moving object. Thus, the image can remain in focus when the image is moving. This can be beneficial for low light applications.

Figure 5:
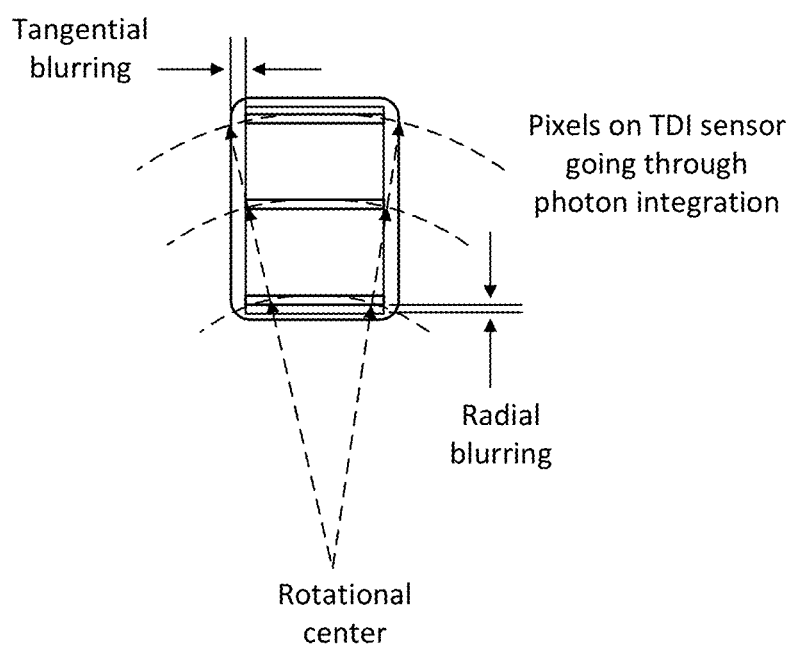
FIG. 5 illustrates image blurring control in accordance with the present disclosure.

FIG. 5 illustrates image blurring control. In FIG. 5, R is the radial length and Θ is the rotational movement. In an R-Θ based scanning inspector system, circular rotation of inspection surface can be employed. The linear spatial integration nature of a Cartesian TDI-CCD sensor incurs accumulating photons from pixels in rows. When the scanning radius becomes smaller, image blurring occurs when scanning curvature exceeds the row of pixels. FIG. 5 depicts two blurring effects namely tangential blurring and radial blurring.

Radially, due to the rotational nature of image motion, a pixel on inspection surface moves the trajectory of an arc on the TDI-CCD. With radius reducing gradually, the curvature of the arc increases to the point pixel crosses into the next row of TDI-CCD pixels resulting in radial blurring effect. Similarly, within FoV, when TDI clocking is synchronized to the pixel in the middle of the TDI-CCD radially, the lower and higher rows experience effectively shorter or longer physical pixels resulting crossing over the adjacent tangential pixels (i.e., tangential blurring).

Blurring control can be used because the wafer may be rotating while secured to the stage. The image can be moving in an arc, and this can cause problems near the center. The variable slit can reduce blurring effect so it still appears as a line to a sensor. The slit in the variable slit can reduce to zero or near zero toward the center of the wafer. The variable slit can be synched with motion of the stage.

Figure 6:
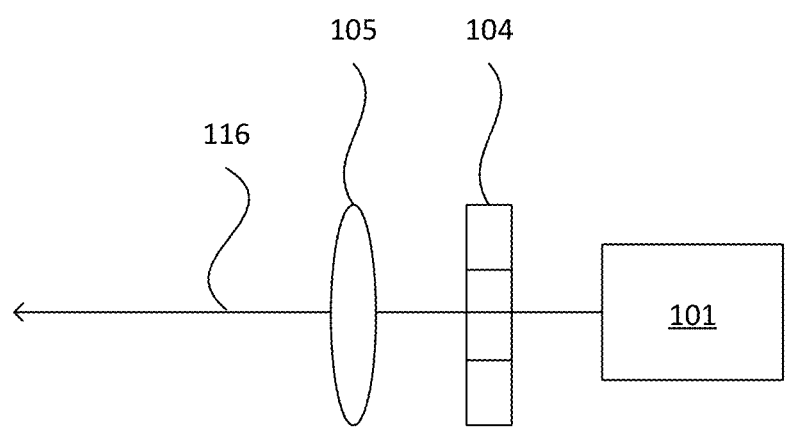
FIG. 6 is a block diagram of an embodiment of a variable field stop in accordance with the present disclosure.
Figure 7:
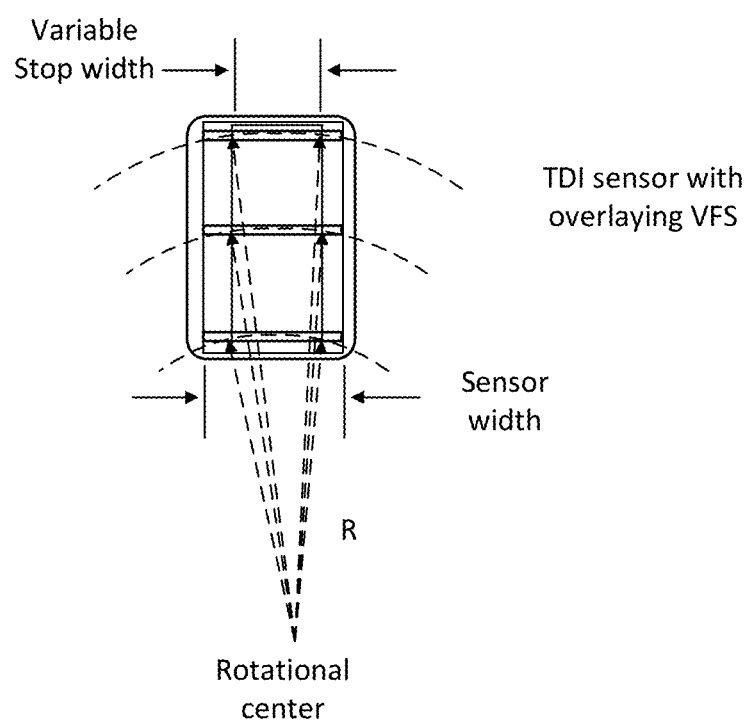
FIG. 7 illustrates the variable field stop of FIG. 6.

The variable field stop can be used to minimize blurring effects on both radial and tangential images. This is shown in FIG. 6 and FIG. 7. The variable field stop, which is an example of the field stop 104 in FIG. 1, is disposed downstream of the illumination source. The collimating optics assembly 105 can serve as illuminating optics. The variable field stop is controlled with a motor and at full open (i.e., full FoV) at the maximum scanning radius of the scanner. Its width is reduced linearly with respect to 1/radius (1/R). If some amount of blurring is tolerable, the variable field stop reducing profile can start at a certain radius. TDI-CCD clocking can be radius dependent in such an R-Θ scanning system. Therefore, light-budget may be considered while optimizing the VFS profile such that blurring and light-budget are all within acceptable levels.

Figure 8:
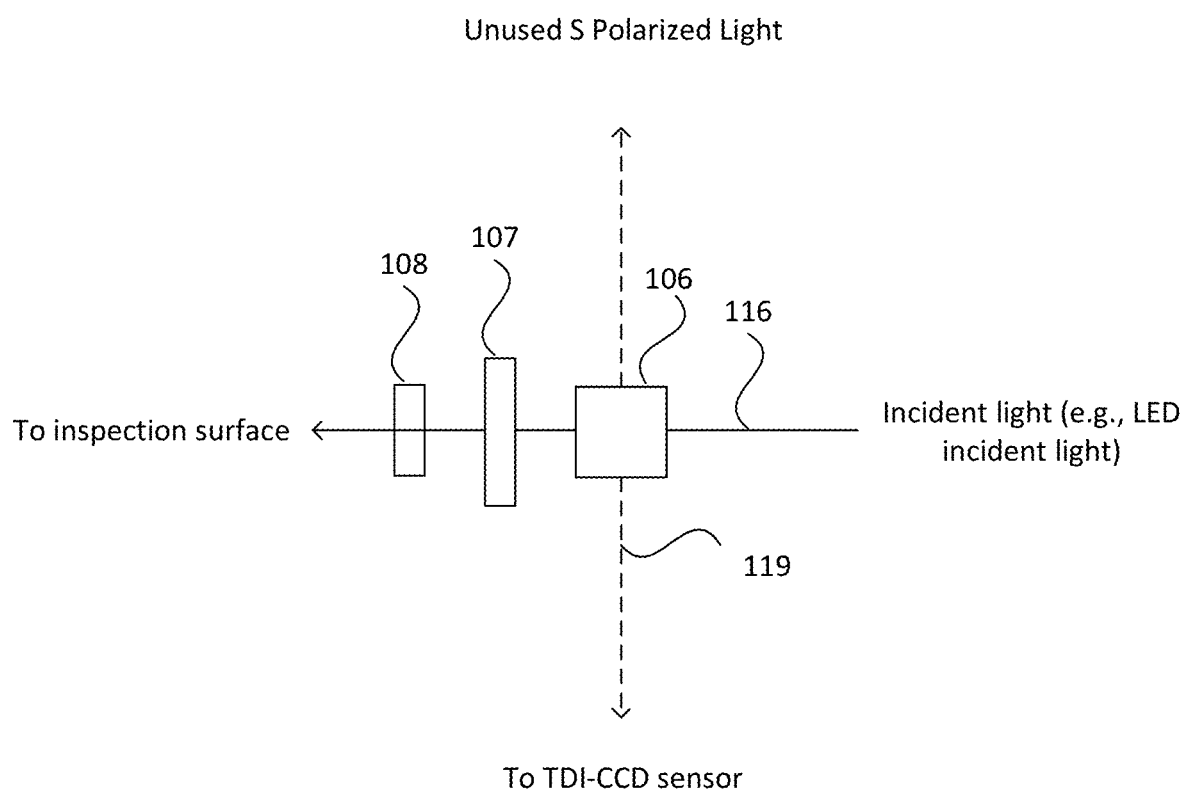
FIG. 8 is a block diagram of an embodiment of polarizing optics in accordance with the present disclosure.

FIG. 8 is a block diagram of an embodiment of polarizing optics. As a cost-effective and space saving measure, a PCC design can adapt a polarizer and half-wave plate combination optical design. As depicted in FIG. 8, the polarizer and Wollaston prism align to 0 degrees of their principle axis whereas the half-wave plate aligns to 22.5 degrees. This allows for P polarized light after the polarizer to be rotated 45 degrees relative to Wollaston prism principle axis. Therefore, equally amount P and S polarized light are produced after the Wollaston prism. On the reflection path, P and S polarized light combine at the Wollaston prism and continue moving another 45 degrees resulting in S polarized light at the polarizer, which is then reflected to the TDI-CCD detector. Such a design is cost effective and also results in higher light efficiency. In addition, given the scanning nature of PCC design, such a polarization optimization design orients the Wollaston prism in the smallest numerical aperture (NA) light propagation axis and, therefore, can result in the lowest phase retardation uniformity across FoV.

In an instance, the inspection system operates in R-Θ instead of perpendicular X and Y directions. The beams may need to be aligned in the R direction. A half-wave plate can prevent the two beams from being separated by 45 degrees. Thus, the polarizer can separate the beam into two beams and the half-wave plate can align the two beams together. A lens system can be used instead of a half-wave plate to achieve the same result.

Figure 9:
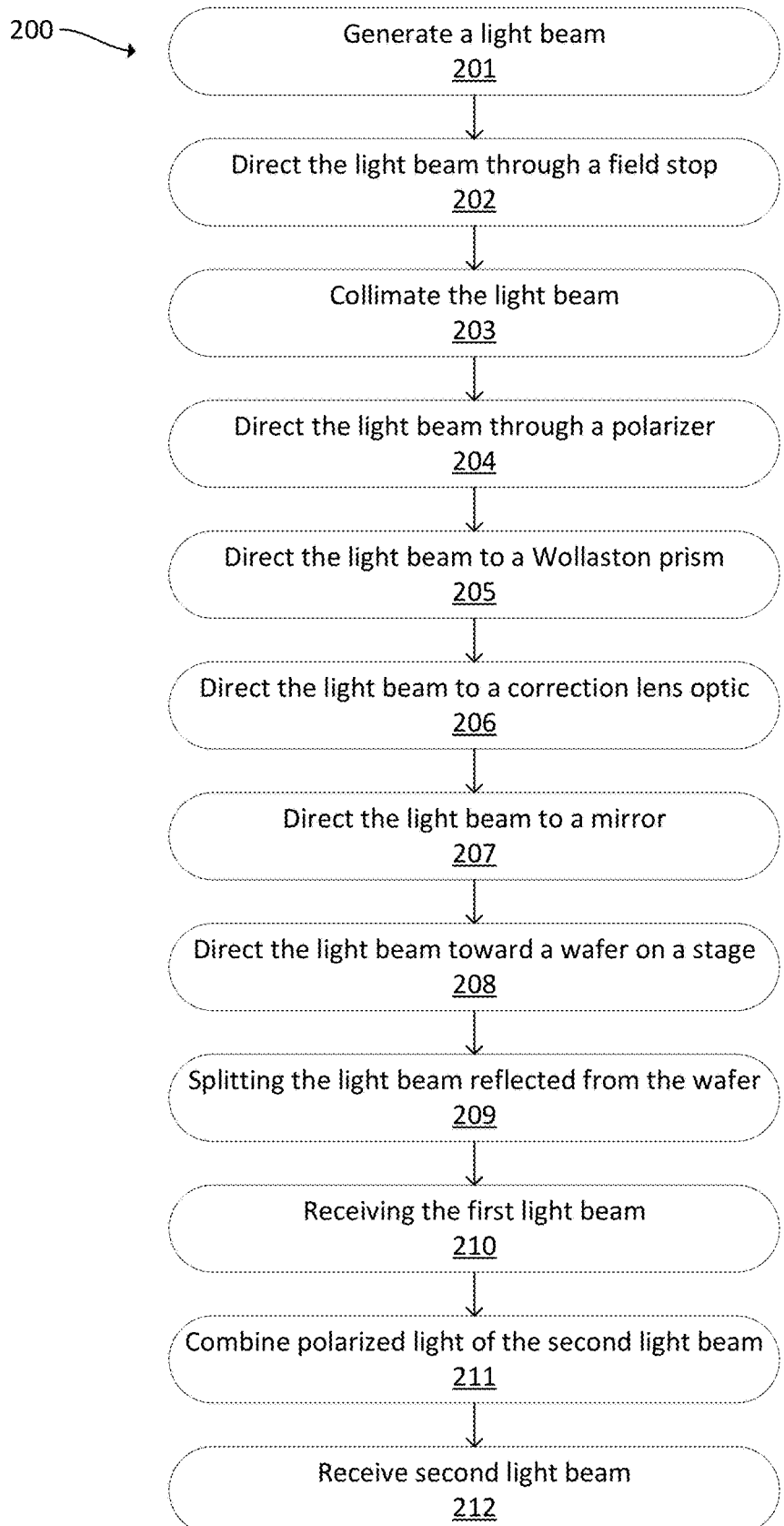
FIG. 9 is a flowchart of a method in accordance with the present disclosure.

FIG. 9 is a flowchart of a method 200. At 201, a light beam is generated using an illumination source such as a broadband LED. The light beam is directed from the illumination source through a field stop at 202. The light beam directed by the field stop is collimated using a collimating optics assembly at 203. The field stop can be a controlled variable field stop. A tangential width of the field stop is configured to vary with scanning radius whereby the tangential width at an end of the field stop is larger than at an opposite end of the field stop.

The light beam is directed from the collimating optics assembly through a polarizer at 204. The light beam is directed from the polarizer to a Wollaston prism 205. The Wollaston prism can be oriented with a principle axis at 0 degrees.

The light beam is directed from the Wollaston prism to a correction lens optic at 206. The light beam is directed from the correction lens optic to a mirror at 207, such as a fold mirror. The light beam is directed toward a wafer on a stage through an objective lens assembly at 208. The correction lens optic, the mirror, and the objective lens assembly are configured to focus P polarized light and S polarized light from the Wollaston prism onto the stage. The P polarized light and the S polarized light are separated in a shear direction of the Wollaston prism.

The light beam reflected from the wafer on the stage is split into a first light beam and a second light beam with a dichroic mirror at 209. The light beam reflected from the wafer on the stage is split with a dichroic mirror into a first light beam and a second light beam at 209. The first light beam is received with a dark field/bright field sensor at 210. The P polarized light and the S polarized light of the second light beam are combined at the Wollaston prism at 211. The second light beam from the Wollaston prism is received with a TDI-CCD sensor at 212.

In the method 200, the polarizer can be a polarizing beam splitter cube in the light path. The polarizing beam splitter can be configured to pass P polarized light and reflect S polarized light.

The method 200 can further include directing the light beam through a half wave plate that rotates the P polarized light by 45 degrees. The half wave plate can be disposed between the polarizer and the Wollaston prism.

Each of the steps of the method may be performed as described herein. The methods also may include any other step(s) that can be performed by the processor and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. An apparatus comprising:
   at least one illumination source;
   a stage configured to secure a wafer;
   a TDI-CCD sensor;
   a dark field/bright field sensor;
   a field stop in a light path from the illumination source;
   a polarizer in the light path, wherein the polarizer is configured to pass P polarized light and reflect S polarized light;
   a Wollaston prism in the light path, wherein the Wollaston prism forms the P polarized light and the S polarized light;
   a correction lens optic in the light path;
   a mirror in the light path that receives the P polarized light and the S polarized light from the Wollaston prism; and
   an objective lens assembly in the light path, wherein the correction lens optic, the mirror, and the objective lens assembly are configured to focus the P polarized light and the S polarized light onto the stage, wherein the P polarized light and the S polarized light are separated in a shear direction of the Wollaston prism, and wherein the P polarized light and the S polarized combine at the Wollaston prism.

2. The apparatus of claim 1, wherein the polarizer is a polarizing beam splitter cube.

3. The apparatus of claim 1, wherein the field stop is a controlled variable field stop, wherein a tangential width of the field stop is configured to vary with scanning radius whereby the tangential width at an end of the field stop is larger than at an opposite end of the field stop.

4. The apparatus of claim 1, further comprising a half wave plate in the light path that rotates the P polarized light by 45 degrees.

5. The apparatus of claim 1, wherein the Wollaston prism is oriented with a principle axis at 0 degrees.

6. The apparatus of claim 1, wherein the mirror is a fold mirror.

7. The apparatus of claim 1, wherein the illumination source is a broadband light emitting diode.

8. The apparatus of claim 1, further comprising a dichroic mirror in the light path between the objective lens assembly and the mirror.

9. The apparatus of claim 8, wherein the dichroic mirror directs the S polarized light at the dark field/bright field sensor.

10. The apparatus of claim 1, further comprising a collimating optics assembly in the light path between the field stop and the polarizer.

11. The apparatus of claim 1, wherein the apparatus is configured to provide a differential interference contrast mode.

12. A method comprising:
    generating a light beam using an illumination source;
    directing the light beam from the illumination source through a field stop;
    directing the light beam from the field stop through a polarizer;
    directing the light beam from the polarizer to a Wollaston prism;
    directing the light beam from the Wollaston prism to a correction lens optic;

directing the light beam from the correction lens optic to a mirror;

directing the light beam toward a wafer on a stage through an objective lens assembly, wherein the correction lens optic, the mirror, and the objective lens assembly are configured to focus P polarized light and S polarized light from the Wollaston prism onto the stage, wherein the P polarized light and the S polarized light are separated in a shear direction of the Wollaston prism;

splitting the light beam reflected from the wafer on the stage with a dichroic mirror into a first light beam and a second light beam;

receiving the first light beam with a dark field/bright field sensor;

combining the P polarized light and the S polarized light of the second light beam at the Wollaston prism; and receiving the second light beam from the Wollaston prism with a TDI-CCD sensor.

13. The method of claim 12, wherein the polarizer is a polarizing beam splitter cube in the light path, wherein the polarizing beam splitter is configured to pass P polarized light and reflect S polarized light.

14. The method of claim 12, further comprising directing the light beam through a half wave plate that rotates the P polarized light by 45 degrees, wherein the half wave plate is disposed between the polarizer and the Wollaston prism.

15. The method of claim 12, wherein the field stop is a controlled variable field stop, wherein a tangential width of the field stop is configured to vary with scanning radius whereby the tangential width at an end of the field stop is larger than at an opposite end of the field stop.

16. The method of claim 12, wherein the Wollaston prism is oriented with a principle axis at 0 degrees.

17. The method of claim 12, wherein the mirror is a fold mirror.

18. The method of claim 12, wherein the illumination source is a broadband light emitting diode.

19. The method of claim 12, wherein the method is configured to provide a differential interference contrast mode.

20. The method of claim 12, further comprising collimating the light beam directed by the field stop using a collimating optics assembly.

* * * * *

UNITED STATES PATENT AND TRADEMARK OFFICE
CERTIFICATE OF CORRECTION

PATENT NO. : 10,705,026 B2
APPLICATION NO. : 16/584370
DATED : July 7, 2020
INVENTOR(S) : Chu Page 1 of 1

It is certified that error appears in the above-identified patent and that said Letters Patent is hereby corrected as shown below:

On the Title Page

Item (72), the Inventors should read:
--(72) Inventors: Raymond Chu, Cupertino, CA (US);
Andrew Zeng, Fremont, CA (US);
Donald Pettibone, San Jose, CA (US);
Chunsheng Huang, San Jose, CA (US);
Bret Whiteside, San Jose, CA (US);
Fabrice Paccoret, San Jose, CA (US);
Xuan Wang, Fremont, CA (US);
Chuanyong Huang, San Jose, CA (US);
Steve Xu, Sunnyvale, CA (US);
Anatoly Romanovsky, Palo Alto, CA (US)--

Signed and Sealed this
Twenty-fourth Day of November, 2020

Andrei Iancu
*Director of the United States Patent and Trademark Office*